United States Patent
Schiedermeier et al.

(10) Patent No.: US 10,263,505 B2
(45) Date of Patent: Apr. 16, 2019

(54) FILTERING OF ALTERNATING VOLTAGE COMPONENTS IN THE INTERMEDIATE CIRCUIT OF A RECTIFIER DEVICE OF A MOTOR VEHICLE

(71) Applicant: AUDI AG, Ingolstadt (DE)

(72) Inventors: Maximilian Schiedermeier, Ingolstadt (DE); Cornelius Rettner, Erlangen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/814,669

(22) Filed: Nov. 16, 2017

(65) Prior Publication Data

US 2018/0166969 A1     Jun. 14, 2018

(30) Foreign Application Priority Data

Dec. 8, 2016 (DE) .................. 10 2016 224 472

(51) Int. Cl.
*H02M 1/12* (2006.01)
*H02M 1/14* (2006.01)
*H02M 7/217* (2006.01)

(52) U.S. Cl.
CPC ............. *H02M 1/126* (2013.01); *H02M 1/14* (2013.01); *H02M 7/2173* (2013.01)

(58) Field of Classification Search
CPC ... H02M 1/126; H02M 7/2173; H02M 7/7575
See application file for complete search history.

(56) References Cited

U.S. PATENT DOCUMENTS

| | | | |
|---|---|---|---|
| 3,290,578 A | | 12/1966 | Ainsworth |
| 4,788,485 A | * | 11/1988 | Kawagishi ............ H02M 1/425 318/807 |
| 6,091,615 A | * | 7/2000 | Inoshita ............ H02M 7/53873 363/132 |

(Continued)

FOREIGN PATENT DOCUMENTS

| | | |
|---|---|---|
| DE | 19947476 A1 | 4/2001 |
| DE | 10062075 A1 | 6/2002 |

(Continued)

OTHER PUBLICATIONS

German Search Report dated Sep. 25, 2017 of corresponding German application No. 10 2016 224 472.8; 7 pgs.

(Continued)

*Primary Examiner* — Jue Zhang
*Assistant Examiner* — David A. Singh
(74) *Attorney, Agent, or Firm* — Maier & Maier, PLLC

(57) ABSTRACT

A rectifier device which is used for a motor vehicle. Such a device includes a switching unit, which is connected to an intermediate circuit and can be operated with a predetermined switching frequency and provided with a plurality of filter elements connected in an intermediate circuit. Each is equipped with an inter intermediate circuit capacitance. A minimum of the magnitude frequency response of a respective filter element is within a different frequency interval, which has a harmonic of the switching frequency as a middle frequency and an interval length corresponding to the switching frequency as a respective minimum of the magnitude frequency response.

10 Claims, 3 Drawing Sheets

(56) References Cited

U.S. PATENT DOCUMENTS

| | | | | |
|---|---|---|---|---|
| 6,353,545 B1* | 3/2002 | Ueda | ................ | H02M 1/36 323/908 |
| 9,621,094 B2* | 4/2017 | Vrankovic | ............. | H02P 23/28 |
| 2002/0034089 A1* | 3/2002 | Mori | ................ | H02M 5/4585 363/147 |
| 2003/0043603 A1* | 3/2003 | Schreiber | ............. | H02M 5/458 363/37 |
| 2004/0223346 A1* | 11/2004 | Rayner | ................ | H02M 5/458 363/37 |
| 2007/0002594 A1* | 1/2007 | Otsuka | ................ | H02M 7/003 363/37 |
| 2010/0328975 A1* | 12/2010 | Hibino | ................ | H02M 7/003 363/126 |
| 2011/0181993 A1* | 7/2011 | Yamaguchi | ............ | H02M 7/003 361/111 |
| 2011/0292686 A1* | 12/2011 | Oka | ................ | H02M 1/14 363/13 |
| 2012/0106220 A1* | 5/2012 | Yamaguchi | ............ | H05K 7/209 363/131 |
| 2013/0056755 A1* | 3/2013 | Hatai | ................ | H01L 23/49805 257/77 |
| 2013/0308352 A1 | 11/2013 | Wu et al. | | |
| 2014/0111176 A1 | 4/2014 | Nishimura | | |
| 2014/0321171 A1* | 10/2014 | Fujita | ................ | H02M 1/14 363/37 |
| 2015/0023083 A1* | 1/2015 | Nakagawa | ............ | H02M 1/126 363/132 |
| 2015/0049526 A1* | 2/2015 | Kagimura | ............ | H02M 5/4585 363/50 |
| 2015/0288290 A1* | 10/2015 | Iwamoto | ................ | H02M 3/158 363/21.06 |
| 2017/0149343 A1* | 5/2017 | Bhandarkar | .......... | H02M 1/126 |
| 2017/0353138 A1* | 12/2017 | Zhang | ................ | H02M 1/126 |

FOREIGN PATENT DOCUMENTS

| | | | | |
|---|---|---|---|---|
| DE | 602006000202 T2 | | 8/2008 | |
| DE | 102012220247 | * | 5/2014 | ............. H02M 1/14 |
| DE | 102012220247 A1 | | 5/2014 | |
| EP | 2608389 A1 | | 6/2013 | |
| GB | 1411440 A | | 10/1975 | |

OTHER PUBLICATIONS

European Search Report dated Apr. 5, 2018 of corresponding European application No. 17197206.0; 6 pgs.

* cited by examiner

FILTERING OF ALTERNATING VOLTAGE COMPONENTS IN THE INTERMEDIATE CIRCUIT OF A RECTIFIER DEVICE OF A MOTOR VEHICLE

FIELD

The invention relates to a rectifier device for a motor vehicle comprising a switching unit, which is connected to an intermediate circuit of the rectifier device and can be operated with a predetermined switching frequency, and a plurality of filter elements, which are connected in the intermediate circuit and respectively provided with an intermediate circuit capacitance.

BACKGROUND

Three-phase motors which are often used in motor vehicles can be fully or partially operated electrically are controlled by means of a rectifier device, such as for example a frequency converter. In this case, a switching unit designed with semiconductor components typically forms half-bridge circuits with an output part. The latter is supplied by means of an intermediate circuit which in particular filters undesirable alternating currents occurring during the switching operations of the switching unit. It has been already proposed to use several filter elements, each provided with an intermediated circuit capacitance, in order to realize broadband filtering of these alternating current components. The purpose of the filter is in particular to prevent mutual interference between the high-voltage components in the motor vehicle to improve electromagnetic compatibility and to increase the lifespan of a battery connected with the rectifier device which is sensitive to alternating currents.

DE 100 62 075 A1 discloses an inverter which is connected to an intermediate voltage circuit provided with a charge storage device, wherein the convertor contains a semiconductor or bridge circuit, and the half-bridge or bridge circuit is a component of a unit arranged in a housing, wherein the charge storage device is provided with several intermediate circuit capacitors, among which one component, several of them, or all of them are also integrated components of the module.

DE 199 47 476 A1 discloses an inverter for converting electric energy for a network onboard a vehicle provided with a half-bridge, which comprises at least a high-side and a low-side switch equipped with a predefinable number of switches which are provided with a common connection that is connected to a means generating electric energy and to a capacitor connected in parallel to the half-bridge.

EP 2 608 389 A1 discloses a rectifier circuit comprising at least two submodules in a series circuit, which is related via an inductor to electric power supplied from a power source delivering a DC voltage. Each submodule is on the input side provided with a one-phase half-bridge and with a single-phase full-bridge on the output side, wherein the half-bridge, the full-bridge and an intermediate circuit capacitor are connected in parallel on the DC voltage side. Furthermore, a discharge circuit for discharging the intermediate circuit of the submodules is connected in parallel to the submodules that are connected in series and to the capacitor.

SUMMARY

The object of the invention is to improve the filtering of alternating voltage components in the intermediate circuit of a rectifier device.

In order to achieve this object according to the invention with a rectifier device of the type mentioned in the introduction, it is provided that a minimum of the magnitude frequency response of a respective filter element is within a different frequency interval which is provided with a harmonic of the switching frequency as the middle frequency, and with an interval length corresponding to the switching frequency as a respective minimum of the magnitude frequency response of the remaining filter elements.

The invention is based on the discovery that since alternating voltage components in the intermediate circuit are encountered with harmonics of the switching frequency of the switching unit, a particularly efficient filtering is enabled when a minimum of the magnitude frequency response of a respective filter element is near the harmonic. The invention proposes to design the filter elements in such a way that the minimum depending on the intermediate circuit capacitance of a respective magnitude frequency response is within the frequency interval which comprises a harmonic of the switching frequency as a center. In other words, the frequency spectrum to be filtered is divided into a plurality of frequency intervals, wherein each is provided with a harmonic of the switching frequency as the center frequency, and with an interval length corresponding at the most to the switching frequency. The respective minimum of the magnitude frequency response of the filter element must then be selected in such a way that it is within a frequency interval, wherein the filter elements can filter the respective different harmonics. The switching frequency can be the clock frequency of the switching unit.

The individual filter elements can thus be adapted in an advantageous manner to the alternating voltage components generated with the switching operations of the switching unit in the intermediate circuit. For each filter element can thus be determined a particularly advantageous or even an optimal intermediate circuit capacitance. The amount of each respective intermediate circuit capacity can thus be reduced, so that excessive dimensions of the filter element can be avoided and advantages relating to space and cost can be achieved. In addition, voltage ripples on the side of the intermediate circuit opposite the switching unit are reduced more efficiently, which improves the electromagnetic compatibility of the rectifier device. The expense required for additional filters for improving the electromagnetic compatibility of the rectifier device can thus be reduced or completely eliminated, which further reduces both the space requirements and the cost.

A respective filter element can be formed as a dual port element, wherein the intermediate circuit capacitance forms a transverse capacitance of the dual port component.

The filter elements can be connected in a chain, wherein one filter element is connected to a high-side switching element and one low-side switching element is connected to the switching unit. The minimum magnitude frequency response is in particular a global minimum of a frequency range between a half of switching frequency and its tenfold amount, in particular its fivefold amount.

According to the rectifier device of this invention, it is preferred when the middle frequencies are the first harmonics of the switching frequencies corresponding to the number of the filter elements. Tests have shown that the highest magnitudes of the undesirable alternating voltage are located in the frequency intervals described by these center frequencies. In particular, the second harmonic can be filtered, which typically has the highest amount of energy. As an alternative or additionally, a respective interval length can be a quarter, in particular a tenth, of the switching frequency.

The minimums can thus be selected to be substantially closer to the respective harmonics in order to achieve a particularly efficient filtering of the respective undesirable alternating voltage elements.

The filter elements are preferably designed as a suction circuit and/or as a band-stop filter and/or as a notch filter. At the same time, it is also conceivable that all filter elements are of the same type as the filter types mentioned above, which can also be used in combination with different types of filters in the rectifier device. All filter types are characterized in that they have a minimum of the magnitude frequency response at their resonant or blocking frequency, so that they are suitable for a realization of the filter elements of the rectifier device according to the invention.

In order to predetermine the minima of the magnitude frequency response of the filter elements, it is particularly advantageous when at least one or at least some filter elements are provided with an inductance element connected in series with its intermediate circuit capacitance. Intermediate circuit capacitances realized as passive structural elements are in practice provided with a certain parasitic inductivity, which also determines the minimum of the magnitude frequency response, i.e. for example a resonance frequency. In order to provide the preset minima of the magnitude frequency response of a filter element as precisely as possible, it is proposed to provide additionally an inductance element which is connected with the intermediate circuit capacitance in series. Such an inductance element thus forms a cross-inductance of the dual port element.

It is preferred when the inductance element is formed with a line connection to the intermediate circuit capacitance, which has a predetermined length and/or form and/or arrangement which determines the inductance of the inductance element within a plurality of planes of a circuit board. An inductance can thus be provided with a suitable design of the line connection, and its amount can be set with a great precision based on the geometrical dimensions of the line connection. In particular when a circuit board is used which is provided with a line connection in the form of a conductor track, the inductance of the inductance element can be adjusted by guiding the line connection within the levels of the circuit board.

According to a further development of the rectifier device according to the invention it is provided that at least one filter element or each respective filter element is provided as a longitudinal inductance, which is connected as a longitudinal inductance for the intermediate circuit capacitance which is arranged as a transverse capacitance. A more complex filter architecture can thus also be realized in this manner to specify an optimum course of the magnitude frequency response of a respective filter element.

It is expedient when the intermediate circuit capacitance of a respective filter element is realized with a capacitor. Since a (real) capacitor always has also a parasitic series resistor which displays a parasitic series inductance, a suitable filter element can be realized or designed already in a particularly simple manner with the use of a capacitor.

In this case, the capacitors of a plurality of filter elements or of all the filter elements can have the same construction. This is applicable in particular to filter elements which have the inductance element connected as a longitudinal inductance, because the inductance determining the minimum of the magnitude frequency response is determined by the inductance element or by the inductance elements. With the use of capacitors having the same construction, the rectifier device can be realized in a particularly inexpensive and cost-effective manner because fewer structural components parts can be used.

Alternatively or in addition, the capacitor can have different nominal capacitances of several filter elements or of all filter elements and/or different parasitic series inductances. This relates in particular to embodiments in which the filter elements are realized by means of a single capacitor, which is to say without additional inductance elements. In this case, the invention uses the effect wherein with an increasing capacitance and/or increasing voltage resistance of a capacitor, its spatial expansion increases as well, which in turn results in an increase of parasitic series inductance. With a suitable selection of the capacitance and of the dimensions of the capacitor, an absolute frequency response of a respective filter element can be realized so that it is optimized for the harmonics. Since the resonance frequency of the filter element is in opposite relationship to the product of the capacitance and inductance, a capacitor that has a lower intermediate circuit capacitance can be used for higher-order harmonics. And since the harmonics also display a falling energy level from the second order, capacitors providing significantly greater space-savings can be used. In addition, capacitors provided with a particularly small size enable an arrangement that is more closely related to the switching unit. Moreover, they also have low switching voltages.

It is preferred when the connections of the rectifier device according to the invention is connected or can be connected to a battery and/or a fuel cell of the motor vehicle on the side of the intermediate circuit facing away from the switching unit.

The intermediate circuit can be additionally provided with a parallel-connected capacitor between the filter element arranged closest to the switching unit and the switching unit, wherein a parasitic series inductance of the capacitor and/or an inductance of a line connection for a parallel connection of the capacitor is or are as small as possible. This capacitor is not intended for filtering based on a specific resonance frequency, but instead it is intended to filter in the best manner possible very high frequency components, which occur due to voltage commutation during the switching operations of the switching unit, in order to further reduce switching overvoltages.

The objective on which the invention is based is further achieved according to the invention by a motor vehicle, in particular a motor vehicle comprising a rectifier device according to the invention. All embodiments of the rectifier device according to the invention can be transferred analogously to the motor vehicle according to the invention, so that the advantages mentioned above can be also achieved in this manner.

BRIEF DESCRIPTION OF THE FIGURES

Other advantages and details of the invention will become evident from the embodiments described below, as well as from the figures. The figures are schematic illustrations showing the following.

DETAILED DESCRIPTION OF THE FIGURES

Figure 1:
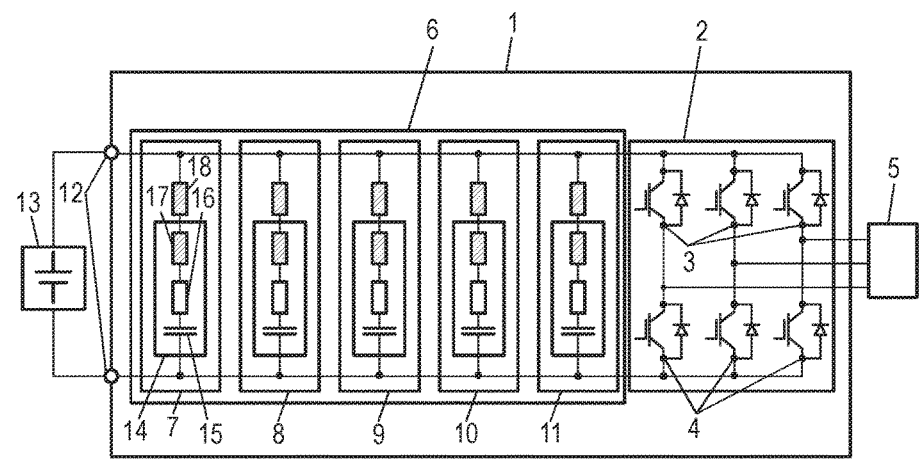
FIG. 1 is a circuit diagram of a first embodiment of a rectifier device for a motor vehicle according to the invention.

FIG. 1 shows a circuit diagram of a first embodiment of a rectifier device 1, comprising a switching unit 2, which is formed from a plurality of high-side switching elements 3 connected to half-bridges, and low-side switching elements (4) formed on a semiconductor basis, and provides a multi-phase alternating voltage for an electric motor 5. In addition, the rectifier device 1 is provided with an intermediate circuit 6 having a plurality of filter elements 7-11 and connections 12 on the side of the intermediate circuit 6 facing away from the switching unit 2, which are connected or can be connected to an energy source, for example a battery and/or a fuel cell.

During the operation of the rectifier device 1, the switching elements 3, 4 are clocked by means of a control device, not shown, with a switching frequency, in order to convert an output voltage of the energy source 13 into a multiphase alternating voltage to be supplied to the electric motor 5. Voltage peaks thus occur in the intermediate circuit 6 due to these switching processes, which occur under an inductive load and which contain undesired alternating voltage components. These undesired voltage components on the one hand put a burden on the energy source 13, which can reduce the lifespan of the energy source 13. On the other hand, they also lead to undesired electromagnetic radiation of the alternating voltage components. Accordingly, the filter elements 7-11 are designed to filter the undesired alternating voltage components.

The filter elements 7-11 are dual port elements that are arranged in a chain circuit between the switching unit 2 and the connections 12. Each filter element 7-11 in this case comprises a capacitor 14 which implements an intermediate circuit capacitance 15. In addition, the capacitor is provided with an internal ohmic resistor 16 and with a parasitic series inductor 17.

The intermediate circuit capacitance 15 consequently acts as a transversal capacitance of the dual port element. In addition, the filter elements 7-11 are respectively provided with a first inductance element 18 connected in series to the capacitor 14. This inductance element is connected by a line connection, in particular via a line connection to the capacitor 14, or it forms its intermediate capacitance 15. The inductance of the first inductance element 18 can be predetermined based on the length, the form and the arrangement of the conductor track within a plurality of planes of the circuit board. Alternatively, the first inductance element 18 may be a wire that is connected to the capacitor 14 with a length and shape determining the inductance.

Accordingly, a respective filter element 7-11 thus forms an absorption circuit whose resonance frequency is determined by the intermediate capacitance 15 and the sum of the parasitic series inductances 17 and the inductance of the first inductance element 18 as a transverse inductance of the filter elements 7-11. With this resonance frequency, the impedance of the respective filter element 7-11 is minimal. This means that the alternative voltages in the intermediate circuit near a respective resonance frequency of the filter elements 7-11 is attenuated. The parasitic series inductance 17 in this case depends mostly on the spatial size of the capacitor 14, which in turn depends on the magnitude of the intermediate circuit capacitance 15 and its voltage strength. The resonance frequency and thus also the minimum of the impedance can therefore be predetermined with precision on the one hand by the design of the capacitor 14, and on the other hand by the inductance of the first inductance element 18. In this context, capacitors 14 having the same construction are used, wherein the resonance frequencies of the filter elements 7-11 are respectively predetermined by the inductance of the first inductive element. Alternatively, it is also possible to dispense with the first inductance element 18 and to predetermine the resonance frequency by using only the geometrical design of the capacitors 14.

The filter elements 7-11 are also characterized in that they have a different resonance frequency so that their magnitude frequency responses also have different minima corresponding to the resonance frequencies. The intermediate circuit capacitance 15, the parasitic series inductance 17 and the inductance of the first inductance element 18 are selected in such a way that the minimum of the magnitude frequency response of each respective filter element 7-11 is within a frequency interval which has an interval length corresponding to the switching frequency. The middle frequencies of the frequency intervals correspond to the first five harmonics of the switching frequency, i.e. the filter element 7 realizes a filtering of the switching frequency, the filter element 8 realizes the filtering of the second harmonic corresponding to twice the switching frequency, etc. The lengths of the intervals can also be different in this case, for example a quarter or a tenth of the switching frequency, in order to select a respective minimum of the magnitude frequency response that is closer to the harmonic to be filtered.

Figure 2:
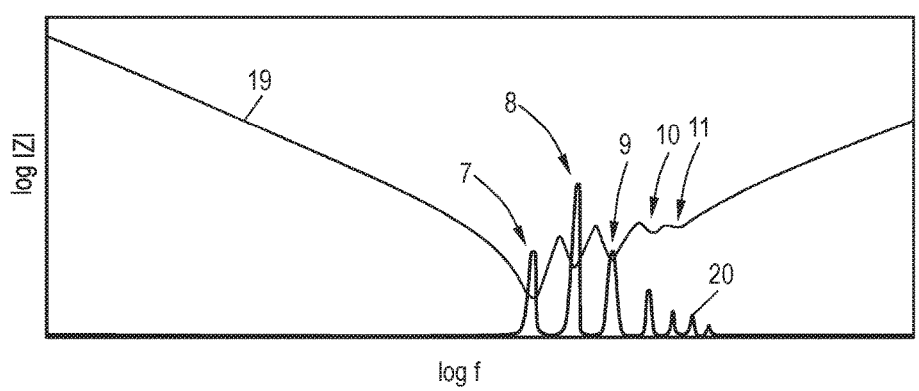
FIG. 2 is a diagram of a magnitude frequency response realized by means of a filter element.

FIG. 2 shows a diagram of a magnitude frequency response 19 which is realized by means of the filter elements 7-11 of a rectifier device. In this case, the logarithm of the impedance Z is plotted against the logarithm of the frequency f. In addition, the spectrum of the alternating voltage to be filtered is plotted purely qualitatively in the intermediate circuit 6. It should be noted in this case that the diagram in FIG. 2 is used only for a qualitative illustration of the filter characteristics of the filter element 7-11 and thus is not necessarily true to scale.

The minima of the filter elements 7-11 provide the magnitude frequency response with a total of five local minima, which attenuate undesirable spectral components in the intermediate circuit 6. However, it is of course also possible to use more or fewer filter elements than the filter element 7-11 shown in FIG. 1 when higher harmonics than the fifth harmonics are to be filtered in order to achieve the desired filtering result, or when a smaller number of harmonics is sufficient to perform filtering.

Figure 3:
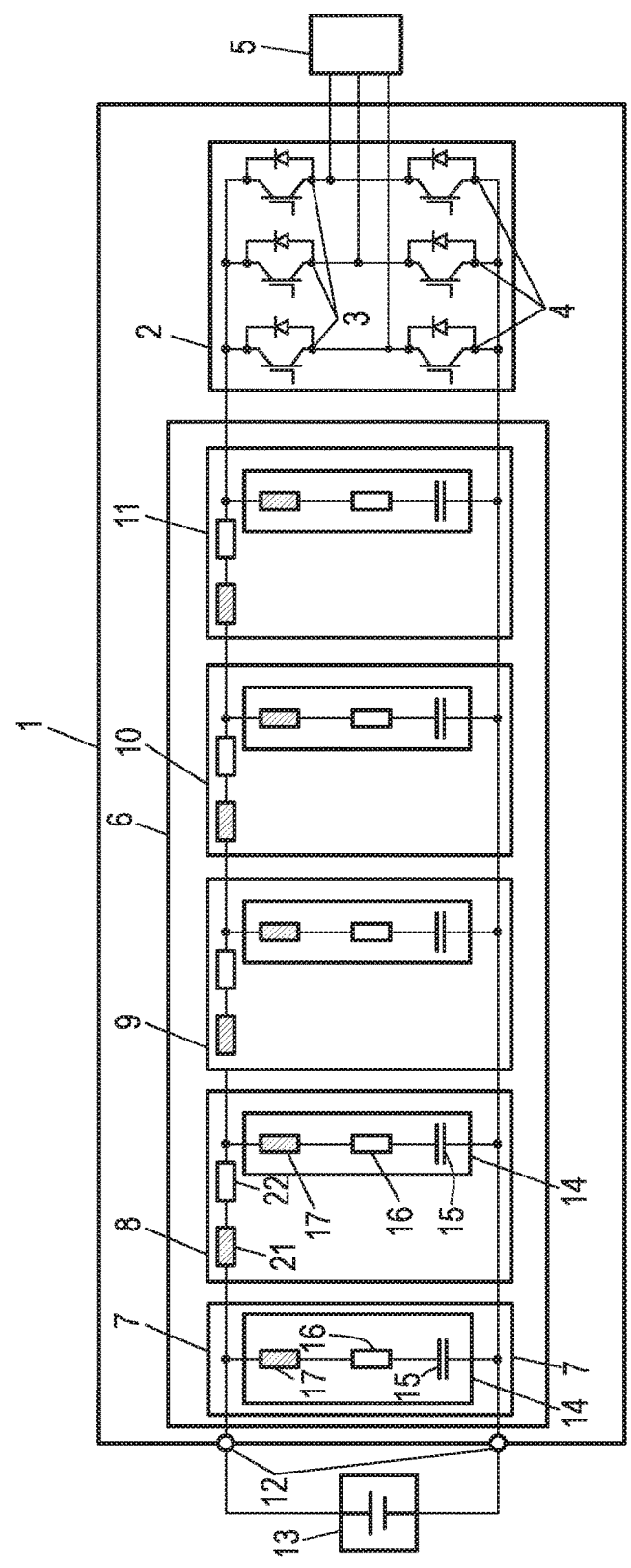
FIG. 3 is a circuit diagram of another embodiment of the rectifier device.

FIG. 3 shows a circuit diagram of an embodiment of a rectifier device 1 corresponding to the device shown in FIG. 1 in which identical or equivalent components are provided with the same reference symbols. The rectifier device 1 for a motor vehicle shown in FIG. 3 differs essentially in that the filter elements 8-11 are provided with a second inductance element 21, which is arranged as a longitudinal inductance instead of the first inductance element 18. Further, an ohmic line resistance 22 is also illustrated, which is connected to it in series.

The filter elements 8-11 are also respectively used to realize a respective filter with a minimum of the magnitude frequency response, which can be predetermined analogously to the absorption circuit of the filter element 7. With a corresponding selection of the intermediate circuit capacitances 15, the parasitic longitudinal inductances 17 and the inductances of the second inductance element 21, a filter architecture can be created that implements the parasitic longitudinal inductances 17 and the inductances of the second inductance element 21, such as in the magnitude frequency response 19 shown in FIG. 2.

According to another embodiment, all filter elements 7-11 can be designed according to the filter elements 8-11 shown in FIG. 3. Moreover, other filter types are also conceivable for individual filter elements 7-11, for example a band-stop filter, or a notch filter.

According to another embodiment of a rectifier device 1 which corresponds to one of the embodiments mentioned above, an additional capacitor (not shown) is connected in parallel between the filter element 11 arranged closest to the switching unit 2 and the switching unit 2. This capacitor is not used for filtering by means of a specific resonance frequency, as its role is instead to filter in the best possible manner the very high frequency components, which occur as a result of voltage commutation with the switching operations of the switching unit 2, in order to further reduce the switching overvoltages via the switching elements 3, 4. The capacitor, for example a ceramic capacitor, is selected to be as small as possible with respect to its parasitic series inductance (corresponding to series inductance 17 in the equivalent circuit diagram representing capacitor 14). The line connections of this capacitor for the parallel connection in the intermediate circuit 6 are designed with as low inductance as possible with respect to their capacitance.

Figure 4:
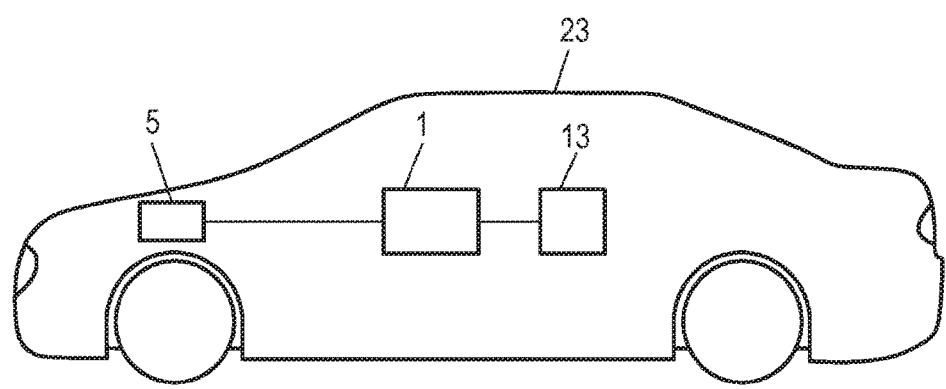
FIG. 4 is a principle diagram of an embodiment of a motor vehicle according to the invention.

FIG. 4 shows a principle diagram of an embodiment of a motor vehicle 23 comprising an energy source 13 in the form of a battery and/or fuel cell, a rectifier device 1 connected downstream of the energy source 13 according to one of the previously described embodiments, and an electric engine 5, which is used to drive completely or partially the motor vehicle 23 and to which energy is supplied by means of the energy source 13 via the rectifier device 1.

The invention claimed is:

1. A rectifier device for a motor vehicle, comprising:
a switching unit, which is connected to an intermediate circuit of the rectifier device and which can be operated with a predetermined switching frequency, and a plurality of filter elements, each of which is connected to a respective circuit capacitance, wherein a minimum of the magnitude frequency response of a respective filter element is within a different frequency interval, which has a harmonic of the switching frequency as the middle frequency and an interval length corresponding to the switching frequency as a respective minimum of the magnitude frequency response of the remaining filter elements,
wherein the plurality of filter elements realize a filtering of the predetermined switching frequency, and
wherein the middle frequencies are the first harmonics of the switching frequency corresponding to the number of filter elements, and a respective interval length is a quarter, in particular a tenth, of the switching frequency.

2. The rectifier device according to claim 1, wherein the filter elements are designed as an absorption circuit and as a band-stop filter and as a notch filter.

3. The rectifier device according to claim 1, wherein at least one or a respective filter element is provided with an inductance element connected in series to its intermediate circuit capacitance.

4. The rectifier device according to claim 3, wherein the inductance element is designed with a line connection to an intermediate capacitance, whose length and shape and arrangement determine the inductance of the inductance element within a plurality of planes of a circuit board.

5. The rectifier device according to claim 4, wherein the intermediate capacitance of a respective filter element is realized by a capacitor.

6. The rectifier device according to claim 5, wherein the capacitors are provided with a plurality of inductance elements, in particular connected in series to the intermediate circuit capacitance, and with an inductance element connected as a longitudinal inductance, having the same construction as the filter elements, or as all filter elements.

7. The rectifier device according to claim 5, wherein the capacitors are provided with a plurality or with all filter elements having different nominal capacitances and different series inductances.

8. The rectifier device according to claim 1, wherein at least one or a respective filter element is provided with an inductance element connected as a longitudinal inductance for the intermediate capacitance arranged as a transverse capacitance.

9. The rectifier device according to claim 1, wherein the connections of the rectifier device are connected or can be connected on the side of the intermediate circuit facing away from the switching device to a battery and a fuel cell of the motor vehicle.

10. The rectifier device according to claim 1, wherein the intermediate circuit can be additionally provided with a capacitor connected in parallel between the filter element that is closest to the next switching device and the switching device, wherein a parasitic series inductance of the capacitor and an inductance of a line connection to the parallel switch of the capacitor is or are as small as possible.

* * * * *